(12) United States Patent
Sekine (10) Patent No.: US 11,922,929 B2
(45) Date of Patent: Mar. 5, 2024

(54) PRESENTATION SUPPORT SYSTEM (71) Applicant: Interactive Solutions Corp., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 7 days.

(21) Appl. No.: 17/042,191

(22) PCT Filed: Jan. 6, 2020

(86) PCT No.: PCT/JP2020/000075
§ 371 (c)(1),
(2) Date: Sep. 28, 2020

(87) PCT Pub. No.: WO2020/153111
PCT Pub. Date: Jul. 30, 2020

(65) Prior Publication Data
US 2021/0020169 A1 Jan. 21, 2021

(30) Foreign Application Priority Data
Jan. 25, 2019 (JP) .................. 2019-011665

(51) Int. Cl.
*G10L 15/02* (2006.01)
*G10L 15/18* (2013.01)

(52) U.S. Cl.
CPC .............. *G10L 15/18* (2013.01); *G10L 15/02* (2013.01)

(58) Field of Classification Search
None
See application file for complete search history.

(56) References Cited

U.S. PATENT DOCUMENTS 5,459,829 A  10/1995 Doi et al.
5,835,722 A * 11/1998 Bradshaw ........... G06F 16/9535
                                                       709/225
(Continued)

FOREIGN PATENT DOCUMENTS

CN    104317781 A    1/2015
CN    104796584 A    7/2015
(Continued)

OTHER PUBLICATIONS

Office Action of Canadian Patent Application No. 3,097,728 dated Dec. 21, 2020 (4 pages).
(Continued)

*Primary Examiner* — Jakieda R Jackson
(74) *Attorney, Agent, or Firm* — Pyprus Pte Ltd; George D. Liu (57) ABSTRACT

To provide a presentation assistance system capable of dynamically changing presentation materials according to terms used in a presentation. A presentation assistance system comprises: a presentation material storage unit 3; a related word storage unit 5 which stores a plurality of related words related to the presentation material; a succeeding information storage unit 7 which stores, for each of the related words, information about a succeeding related word that is one or a plurality of related words that are preferably used next; a related word analysis unit 9 which analyzes which one of the related words corresponds to the word analyzed by a term analysis unit; and a succeeding related word selecting unit 11 which selects a succeeding related word from the succeeding information storage unit, by using information about an analyzed related word which is a related word analyzed by the related word analysis unit.

6 Claims, 5 Drawing Sheets

(56) References Cited

U.S. PATENT DOCUMENTS

| | | | | |
|---|---|---|---|---|
| 6,049,821 | A * | 4/2000 | Theriault | H04L 63/0236 709/203 |
| 6,556,970 | B1 * | 4/2003 | Sasaki | G10L 15/19 706/50 |
| 6,678,822 | B1 * | 1/2004 | Morar | G06Q 10/0875 705/29 |
| 7,146,349 | B2 * | 12/2006 | Benitez-Jimenez | G06F 16/40 706/45 |
| 7,149,957 | B2 * | 12/2006 | Hull | G06F 40/169 715/255 |
| 7,495,795 | B2 * | 2/2009 | Graham | G06F 16/34 358/1.6 |
| 7,941,316 | B2 * | 5/2011 | Mahajan | G10L 15/22 704/235 |
| 9,336,192 | B1 * | 5/2016 | Barba | G06F 40/284 |
| 9,910,931 | B2 * | 3/2018 | Guerrero | G06F 3/0237 |
| 10,956,496 | B2 * | 3/2021 | Greenberg | G06F 16/958 |
| 2002/0019731 | A1 * | 2/2002 | Masui | G06F 40/274 704/7 |
| 2003/0078913 | A1 * | 4/2003 | McGreevy | G06F 16/2462 |
| 2004/0205041 | A1 | 10/2004 | Erol et al. | |
| 2006/0112131 | A1 * | 5/2006 | Harrold | G06F 40/247 707/999.102 |
| 2006/0161520 | A1 * | 7/2006 | Brewer | G06F 16/3322 |
| 2006/0195461 | A1 * | 8/2006 | Lo | G06F 16/93 |
| 2007/0214207 | A1 * | 9/2007 | Xie | G06Q 10/04 709/201 |
| 2007/0287477 | A1 * | 12/2007 | Tran | H04L 65/604 455/466 |
| 2007/0294612 | A1 * | 12/2007 | Drucker | G09B 5/00 715/732 |
| 2008/0091423 | A1 * | 4/2008 | Roy | G10L 15/26 704/235 |
| 2008/0270138 | A1 * | 10/2008 | Knight | G06F 16/433 704/260 |
| 2008/0270462 | A1 * | 10/2008 | Thomsen | G06F 16/2471 |
| 2008/0300853 | A1 * | 12/2008 | Xiaoning | G06F 3/0237 704/10 |
| 2009/0006543 | A1 * | 1/2009 | Smit | G06F 3/04886 707/E17.108 |
| 2011/0107205 | A1 * | 5/2011 | Chow | G06F 16/335 715/255 |
| 2011/0125503 | A1 * | 5/2011 | Dong | G10L 21/06 704/E15.001 |
| 2011/0201387 | A1 * | 8/2011 | Paek | G06F 3/0237 455/566 |
| 2012/0016671 | A1 * | 1/2012 | Jaggi | G10L 15/22 704/235 |
| 2013/0006613 | A1 * | 1/2013 | Karov Zangvil | G06F 3/0237 704/9 |
| 2013/0080153 | A1 * | 3/2013 | Tanaka | G06F 40/129 704/9 |
| 2013/0144605 | A1 * | 6/2013 | Brager | G06F 40/40 704/9 |
| 2013/0179790 | A1 * | 7/2013 | Nadiadi | G06Q 30/02 715/730 |
| 2013/0275120 | A1 * | 10/2013 | DeGross | G06F 40/40 704/9 |
| 2013/0304742 | A1 * | 11/2013 | Roman | H04L 51/212 707/740 |
| 2014/0278633 | A1 * | 9/2014 | Daly | G06Q 10/1053 705/7.14 |
| 2014/0310062 | A1 * | 10/2014 | Klein | G06Q 30/0203 705/7.32 |
| 2015/0006563 | A1 * | 1/2015 | Carattini | G06F 16/24534 707/765 |
| 2015/0121248 | A1 * | 4/2015 | Levin | G06F 3/04842 715/752 |
| 2015/0154185 | A1 * | 6/2015 | Waibel | G06F 40/205 704/2 |
| 2015/0309985 | A1 * | 10/2015 | Brav | G06F 40/284 704/9 |
| 2015/0317069 | A1 * | 11/2015 | Clements | G06F 3/04842 715/773 |
| 2015/0379988 | A1 * | 12/2015 | Corfield | G10L 15/183 704/255 |
| 2016/0071511 | A1 * | 3/2016 | Park | G06F 40/295 704/260 |
| 2016/0299896 | A1 * | 10/2016 | Bawri | G06F 16/285 |
| 2017/0103059 | A1 * | 4/2017 | Cai | G06F 40/137 |
| 2017/0270092 | A1 * | 9/2017 | He | G06F 3/0482 |
| 2018/0025657 | A1 * | 1/2018 | Kim | G09B 5/06 434/169 |
| 2018/0089335 | A1 * | 3/2018 | Huang | G06F 16/90344 |
| 2018/0109636 | A1 * | 4/2018 | Hardy | H04L 67/125 |
| 2019/0012306 | A1 * | 1/2019 | Dvorak | G06F 8/34 |
| 2019/0355346 | A1 * | 11/2019 | Bellegarda | G06F 40/289 |
| 2019/0361962 | A1 * | 11/2019 | Laursen | G06F 16/93 |
| 2020/0004828 | A1 * | 1/2020 | Kersting | G06K 9/6276 |

FOREIGN PATENT DOCUMENTS

| | | |
|---|---|---|
| JP | 2002-259635 A | 9/2002 |
| JP | 2013-025609 A | 2/2013 |
| JP | 2017-224052 A | 12/2017 |
| JP | WO2018/221119 A1 | 12/2018 |
| JP | WO2018/221120 A1 | 12/2018 |

OTHER PUBLICATIONS

Office Action of Chinese Patent Application No. 202080002037.1 dated Jan. 22, 2021 (6 pages).

Office Action of Canadian Patent Application No. 3,097,728 dated Nov. 9, 2022 (4 pages).

International Search Report of International Patent Application No. PCT/JP2020/000075 completed Mar. 18, 2020 and dated Mar. 31, 2020 (4 pages).

Written Opinion of International Patent Application No. PCT/JP2020/000075 completed Mar. 18, 2020 and dated Mar. 31, 2020 (3 pages).

* cited by examiner

PRESENTATION SUPPORT SYSTEM

TECHNICAL FIELD

The present invention relates to a presentation support system.

BACKGROUND ART

JP-A-2002-259635 describes a system that displays keywords from statements made by participants in an argument during the argument in combination of drawing objects and texts.

JP-A-2017-224052 describes a presentation evaluation device using a voice analysis terminal.

Patent Document 1: JP-A-2002-259635
Patent Document 2: JP-A-2017-224052

DISCLOSURE OF THE INVENTION

Problems to be Solved by the Invention

In a usual presentation material, such as PowerPoint (registered trademark), an order of materials is fixed, and the presentation material cannot be flexibly varied according to an audience and a description by a presenter. Additionally, even using correct terms in a presentation, there may be a case that the terms carry conviction or do not carry conviction depending on a direction of the conversation.

Accordingly, it is preferred that the presentation material can be guided along a further attractive story. Especially, it is preferred that the presentation material can be dynamically varied according to the terms used in the presentation. Further, when the presentation is performed, fulfillment of a duty for explanation can be preferably easily checked. An object of this Specification is to provide any of a system that can perform these preparations and a system that can perform these processes.

Solutions to the Problems

Analyzing association of related terms and displaying a related term to be used next to a certain related term allow promoting a further attractive presentation material. Additionally, a record that respective terms have been described can be kept.

An aspect described in this Specification relates to a presentation support system 1. This presentation support system 1 includes a presentation material storage unit 3, a related term storage unit 5, a subsequent information storage unit 7, a term analysis unit 9, a related term analysis unit 11, a display unit 13, and a subsequent related term selection unit 15.

Presentation Support System 1

The presentation support system is a system using a computer for support when a speaker (presenter) gives a description or a presentation using a presentation material. The presentation support system 1 especially relates to a system that recognizes the presentation by the presenter by voice by the computer and extracts a presentation material (or a candidate for the presentation material) preferred to be displayed next by the computer using terms included in the presentation recognized by voice for support such that the presentation can be resourcefully and dynamically performed.

The presentation material storage unit 3 is an element configured to store a presentation material.

The related term storage unit 5 is an element configured to store a plurality of related terms related to the presentation material stored by the presentation material storage unit 3.

The subsequent information storage unit 7 is an element configured to store information on a subsequent related term as one or a plurality of related terms preferred to be used next to each of the plurality of related terms stored by the related term storage unit 5.

The term analysis unit 9 is an element configured to analyze a word included in a conversation to obtain conversation information.

The related term analysis unit 11 is an element configured to analyze whether the word analyzed by the term analysis unit 9 is any of the plurality of related terms.

The display unit 13 is an element configured to display the presentation material.

The subsequent related term selection unit 15 is an element configured to select the subsequent related term related to the analyzed related term from the subsequent information storage unit 7 based on information on the analyzed related term as the related term analyzed by the related term analysis unit.

With such a configuration, the system of this aspect allows preparation to appropriately and resourcefully adjust an order of the presentation materials and a related presentation material used according to the presentation.

A preferred aspect of the above-described presentation support system 1 further includes a related term display control unit 17 configured to cause the display unit 13 to display the subsequent related term related to the analyzed related term selected by the subsequent related term selection unit 15.

A preferred aspect of the above-described presentation support system 1 relates to the following. The presentation material storage unit 3 is configured to associate each related presentation material included in the presentation material with any of the plurality of related terms and store the related presentation material. The system includes a related presentation material display control unit 19. The related presentation material display control unit is an element configured to cause the display unit 13 to display the related presentation material related to the subsequent related term using the information on the subsequent related term related to the analyzed related term selected by the subsequent related term selection unit 15.

Since this related presentation material display control unit is provided, the system of this aspect allows appropriately and resourcefully adjusting the order of the presentation materials and the related presentation material used and displaying them according to the presentation.

A preferred aspect of the above-described presentation support system 1 further includes a used related term storage unit 21 configured to associate the related term analyzed by the related term analysis unit with the conversation information and store the related term. Since which related term was spoken related to the conversation information (for example, who has given a description to whom) can be stored, whether accountability has been responded can be quickly checked.

In a preferred aspect of the above-described presentation support system 1, the plurality of related terms include a taboo word prohibited to be used related to the presentation material. The subsequent information storage unit includes a correction word as information on the subsequent related term related to the taboo word. The system further includes a correction guide unit 23. The correction guide unit 23 is configured such that when the word analyzed by the related term analysis unit is the taboo word, the correction guide unit 23 causes the display unit 13 to display the correction word. The correction guide unit may further output any alert.

In a preferred aspect of the above-described presentation support system 1, the information on the subsequent related term stored by the subsequent information storage unit 7 is updated by analyzing an order of appearance of the plurality of related terms included in a plurality of conversations related to the presentation material.

For example, conversations of a person in charge who had a good record can be analyzed and a recommendation (subsequent related term) can be updated.

In a preferred aspect of the above-described presentation support system 1, the subsequent information storage unit 7 is configured to store a plurality of patterns of the information on the subsequent related terms. The subsequent related term selection unit 15 is configured such that when any of the plurality of patterns is selected, the subsequent related term selection unit 15 selects the subsequent related term related to the selected pattern.

In view of this, for example, as a plurality of patterns (modes), the plurality of patterns, such as a standard mode, a capable mode, a beginner-friendly mode, a mode for specialist, a cheerful mode, and a slow mode, are prepared in advance, and the presentation can be performed according to a physical condition and preference of the other person and the presenter.

Effects of the Invention

With this Specification, the system that can guide the presentation material along a further attractive story can be provided. The system that can dynamically vary the presentation material according to the terms used in the presentation can be provided. Additionally, this ensures providing the system that can easily check that duty for explanation has been fulfilled when the presentation has been performed.

DESCRIPTION OF PREFERRED EMBODIMENTS

Hereinafter, configurations to embody the present invention will be described using the drawings. The present invention is not limited to the configurations described below and includes configurations appropriately modified within a scope apparent by the person skilled in the art from the following configurations.

Aspects described in this Specification relate to the presentation support system 1.

Figure 1:
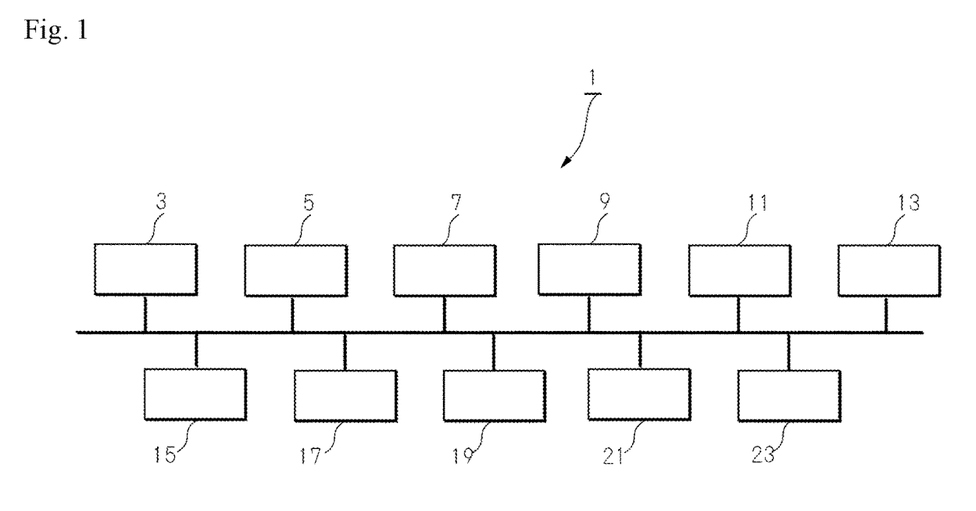
FIG. 1 is a block diagram illustrating an outline of a presentation support system.

FIG. 1 is a block diagram illustrating an outline of the presentation support system. This presentation support system 1 includes a presentation material storage unit 3, a related term storage unit 5, a subsequent information storage unit 7, a term analysis unit 9, a related term analysis unit 11, a display unit 13, and a subsequent related term selection unit 15. This system may appropriately include any of or two or more of a related term display control unit 17, a related presentation material display control unit 19, a used related term storage unit 21, and the correction guide unit 23 described later.

This system includes a computer, and respective elements described below are elements implemented by the computer. The computer may be any of various terminals, a mobile terminal, a notebook computer, a personal computer, and a server.

Figure 2:
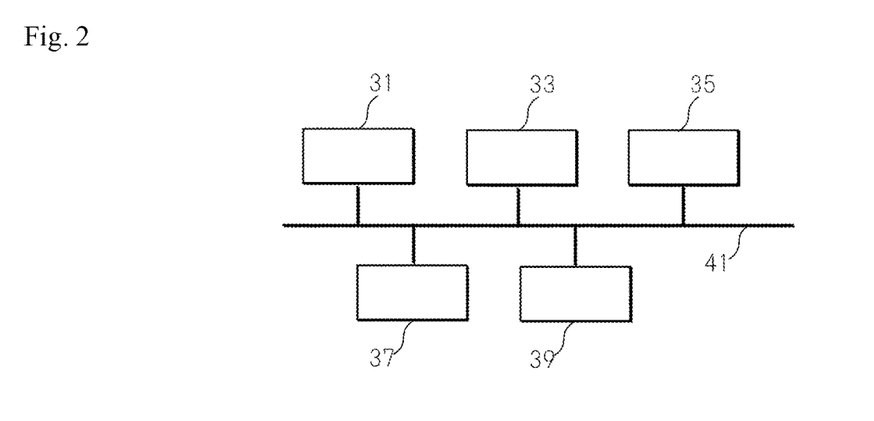
FIG. 2 is a block diagram illustrating a basic configuration of a computer.

FIG. 2 is a block diagram illustrating a basic configuration of the computer. As illustrated in this diagram, the computer includes an input unit 31, an output unit 33, a control unit 35, a calculation unit 37, and a storage unit 39. The respective elements are coupled with, for example, a bus 41 to ensure transmission and reception of information. For example, a control program may be stored in the storage unit, or various kinds of information may be stored. When predetermined information is input from the input unit, the control unit reads the control program stored in the storage unit. The control unit appropriately reads the information stored in the storage unit and transmits it to the calculation unit. The control unit appropriately transmits the input information to the calculation unit. The calculation unit performs arithmetic processing using the various kinds of received information and stores the calculation result in the storage unit. The control unit reads the calculation result stored in the storage unit and outputs it from the output unit. Thus, various kinds of processes are performed. Elements described below each may correspond to any of the elements in the computer.

Figure 3:
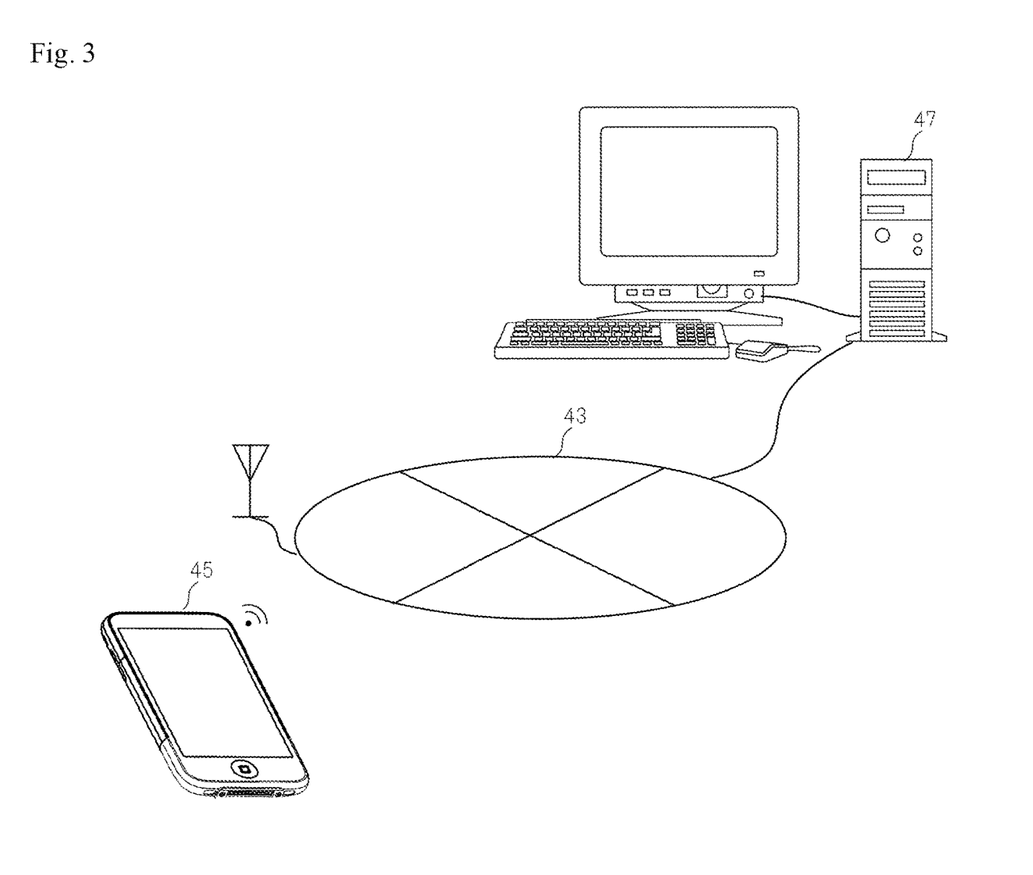
FIG. 3 is a conceptual diagram illustrating a system example of the present invention.

FIG. 3 is a conceptual diagram illustrating a system example of the present invention. As illustrated in FIG. 3, the system of the present invention (the system including the device of the present invention) may include a mobile terminal 45 coupled to the Internet or an intranet 43 and a server 47 coupled to the Internet or the intranet 43. Obviously, a single computer and mobile terminal may function as the device of the present invention or a plurality of servers may be present.

Presentation Support System 1

The presentation support system is a system using a computer for support when a speaker (presenter) gives a description or a presentation using a presentation material. The presentation support system 1 especially relates to a system that recognizes the presentation by the presenter by voice by the computer and extracts a presentation material (or a candidate for the presentation material) preferred to be displayed next by the computer using terms included in the presentation recognized by voice for support such that the presentation can be resourcefully and dynamically performed.

The presentation material storage unit 3 is an element to store the presentation material. For example, the storage unit in the computer functions as a presentation material storage unit. An example of the presentation material is each page of PowerPoint (registered trademark). The presentation material may be a material, such as PowerPoint including a plurality of pages. That is, the presentation material may be a collection of a sequence of page candidates including a plurality of display elements displayed as the presentation. The presentation material is a material stored in the computer and displayed in the display unit to ensure performing the presentation to the speaker himself/herself, a person in conversation, or an audience.

The related term storage unit 5 is an element configured to store a plurality of related terms related to the presentation material stored by the presentation material storage unit 3. For example, the storage unit in the computer functions as the related term storage unit. An example of the plurality of related terms related to the presentation material includes terms possibly used for description based on the respective pages of PowerPoint. The storage unit stores the plurality of related terms related to the respective pages of the presentation material, such as PowerPoint. The storage unit stores the plurality of related terms related to the presentation material related to information (for example, a file ID and a page number) of the presentation material. Examples of the related term include "diabetes," "new medicine," "XYZ," "ABC" (name of another therapeutic agent), "blood glucose level," "side effect," "blood sugar," "glaucoma," "retinopathy," "insulin," "DC pharmaceutical," "side effect," and "insert."

The subsequent information storage unit 7 is an element configured to store information on a subsequent related term as one or a plurality of related terms preferred to be used next to each of the plurality of related terms stored by the related term storage unit 5. For example, the storage unit in the computer functions as the subsequent information storage unit. For example, regarding the related terms "diabetes" and "XYZ," the storage unit stores the subsequent related terms "side effect" and "insert" as the information on the subsequent related terms.

The term analysis unit 9 is an element configured to analyze a word included in a conversation to obtain conversation information. It is an element configured to analyze the word included in the conversation to obtain first conversation information. A voice is input to the presentation support system via, for example, a microphone. Then, the presentation support system stores the conversation (voice) in the storage unit. The term analysis unit 9 analyzes the word included in the conversation and obtains the conversation information. An example of the first conversation information is conversion of the voice into sound information. Note that the presentation support system may include a database that stores candidates for a conversion word for conversion of a word or a phrase included in a conversational sentence and may convert the conversational sentence using the candidate for the conversion word.

The related term analysis unit 11 is an element configured to analyze whether the word analyzed by the term analysis unit 9 is any of the plurality of related terms. The related term storage unit 5 stores the plurality of related terms related to the presentation material. The computer reads the related terms related to the presentation material and performs a process to obtain whether the words included in the conversation match the related terms. When the words included in the conversation matches any of the related terms, the related term is stored (as analyzed related term) and a process described later is performed.

The display unit 13 is an element configured to display the presentation material and the related terms. Examples of the display unit 13 include a monitor and a display. The computer reads the information on the presentation material stored in the storage unit and displays the presentation material in the monitor and a screen. Thus, the presentation material can be displayed for the person in conversation and the audience.

The subsequent related term selection unit 15 is an element configured to select the subsequent related term related to the analyzed related term from the subsequent information storage unit 7 based on information on the analyzed related term as the related term analyzed by the related term analysis unit. The computer reads the related term stored as the analyzed related term from the storage unit. The computer uses the information on the read related term to read the information on the subsequent related term from the subsequent information storage unit 7.

With such a configuration, the system of this aspect allows preparation to appropriately and resourcefully adjust an order of the presentation materials and a related presentation material used according to the presentation.

A preferred aspect of the above-described presentation support system 1 further includes a related term display control unit 17 configured to cause the display unit 13 to display the subsequent related term related to the analyzed related term selected by the subsequent related term selection unit 15. The related term display control unit 17 reads the information on the subsequent related term from the storage unit and causes the display unit to display the read subsequent related term. Thus, the display unit displays the subsequent related term as a term preferably described next to a certain related term, and this contributes to the smooth presentation.

A preferred aspect of the above-described presentation support system 1 relates to the following. The presentation material storage unit 3 is configured to associate each related presentation material included in the presentation material with any of the plurality of related terms and store them. The system includes the related presentation material display control unit 19. The related presentation material display control unit is an element to cause the display unit 13 to display the related presentation material related to the subsequent related term using the information on the subsequent related term selected by the subsequent related term selection unit 15. The related presentation material display control unit receives the information on the subsequent related term and reads the presentation material (related presentation material) stored related to the subsequent related term from the storage unit. The related presentation material display control unit performs control such that the related presentation material read from the storage unit is displayed by the display unit.

That is, the presentation material related to the subsequent related term preferred to be continuous with the related term, not the related term based on the actual conversation, is read and displayed, thereby ensuring the smooth presentation. Since this related presentation material display control unit is provided, the system of this aspect allows appropriately and resourcefully adjusting the order of the presentation materials and the related presentation material used and displaying them according to the presentation.

A preferred aspect of the above-described presentation support system 1 further includes the used related term storage unit 21 configured to associate the related term analyzed by the related term analysis unit with the conversation information and store them. For example, the storage unit functions as the used related term storage unit. As an example of the conversation information, since which related term was spoken related to the conversation information, which is information that who gave the description to whom and when using which presentation material, can be stored, whether an explainer has responded accountability can be quickly checked. Additionally, based on a presentation of a prominent explainer (for example, a prominent MR), the order of appearance of the related terms can be stored, and this can be useful for patterning of an order of registration of the related terms.

In a preferred aspect of the above-described presentation support system 1, the plurality of related terms include a taboo word prohibited to be used related to the presentation material. The subsequent information storage unit includes a correction word as information on the subsequent related term related to the taboo word. The system further includes a correction guide unit 23. The correction guide unit 23 is configured such that when the word analyzed by the related term analysis unit is the taboo word, the correction guide unit 23 causes the display unit 13 to display the correction word. Since the correction word is a term preferred to be used after the use of the taboo word, the correction word is the subsequent related term related to the taboo word. The correction guide unit may further output any alert. For example, when the related term is the taboo word (no good word), the storage unit only needs to turn on a flag corresponding to it. When this flag is read, the presentation support system may perform control such that the alert is output. As an example of the alert, a display of a precautionary statement, "The no good word was used. Correct it." may be displayed in a display unit for the presenter. When the subsequent related term is displayed in the display unit, a display, such as providing a red frame to the related term and a display of the related term in red, different from that in the case where the usual related term is displayed may be performed to ensure calling the presenter's attention. It is only necessary that alert information is transmitted to a mobile terminal (for example, a mobile phone, a smart phone, and a timepiece) of the presenter to output various kinds of alert (for example, the mobile terminal vibrates).

In a preferred aspect of the above-described presentation support system 1, the information on the subsequent related term stored in the subsequent information storage unit 7 is updated by analyzing an order of appearance of the plurality of related terms included in the plurality of conversations related to the presentation material. For example, conversations of a person in charge who had a good record can be analyzed and a recommendation (subsequent related term) can be updated. In this example, the storage unit stores an order that the related terms were used. The related term used next in many cases when a certain related term is used is analyzed by statistics. Thus, the order of and the candidate for the subsequent related term can be selected, and it is only necessary to update the information in the storage unit using the selected subsequent related term.

In a preferred aspect of the above-described presentation support system 1, the subsequent information storage unit 7 is configured to store a plurality of patterns of the information on the subsequent related terms. The subsequent related term selection unit 15 is configured such that when any of the plurality of patterns is selected, the subsequent related term selection unit 15 selects the subsequent related term related to the selected pattern.

In view of this, for example, as a plurality of patterns (modes), the plurality of patterns, such as a standard mode, a capable mode, a beginner-friendly mode, a mode for specialist, a cheerful mode, and a slow mode, are prepared in advance, and the presentation can be performed according to a physical condition and preference of the other person and the presenter.

Next, an example of a presentation support method using the above-described system will be described.

Figure 4:
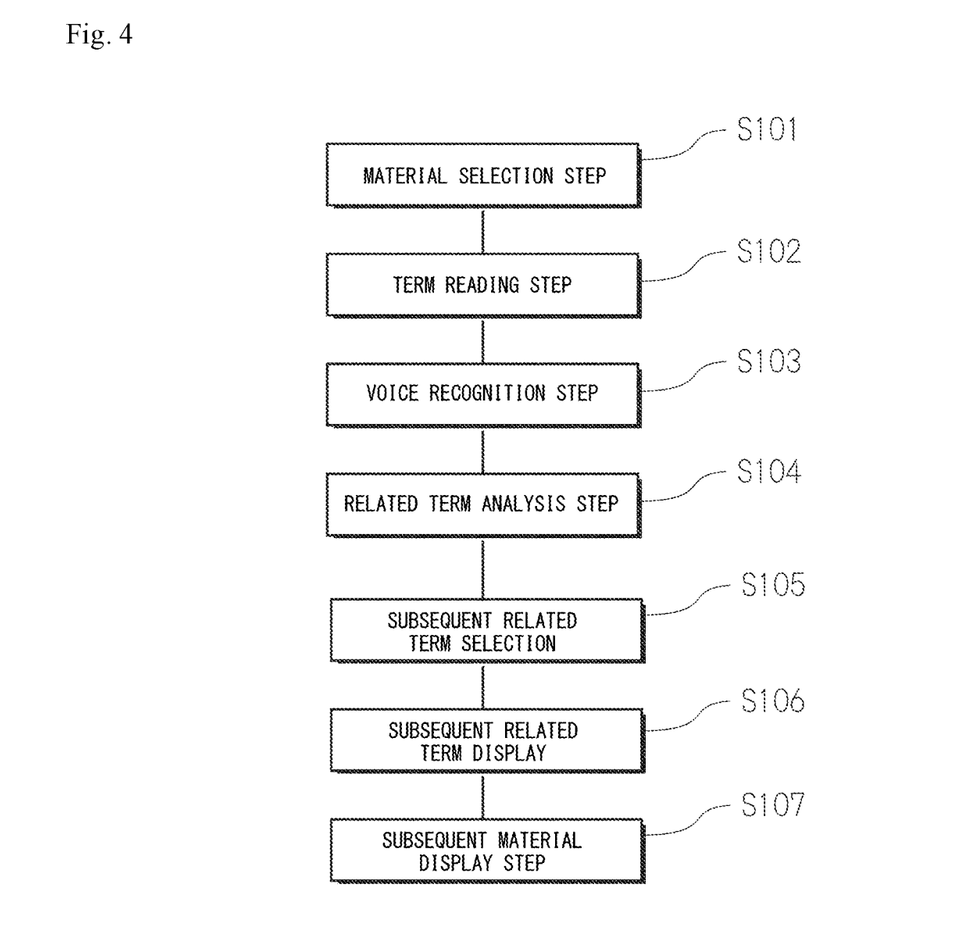
FIG. 4 is a flowchart depicting an example of a presentation support method.

FIG. 4 is a flowchart depicting the example of the presentation support method. This method is implemented by the computer, and, in addition to the program that causes the computer to function as the above-described respective elements, the present invention also provides a program to cause the computer to perform each steps described below.

Material Selection Step (S101)

The presenter selects the presentation material installed on the computer. Then, the computer receives information that a certain presentation material is selected. The presentation material storage unit stores a plurality of presentation materials, and the specific presentation material is read based on the information that the certain presentation material is selected. Note that the computer may read the selected presentation material from the storage unit and display it in the display unit. The display unit may be a display unit of a computer for the presenter, may be a display unit of a computer seen by the other person, or may be both of the display units.

Term reading step (S102) The related term storage unit stores the plurality of related terms related to the respective presentation materials. The subsequent information storage unit stores the information on the subsequent related terms related to the respective related terms. Based on the information that the certain presentation material has been selected, the information on the respective related terms and subsequent related terms is read.

Figure 5:
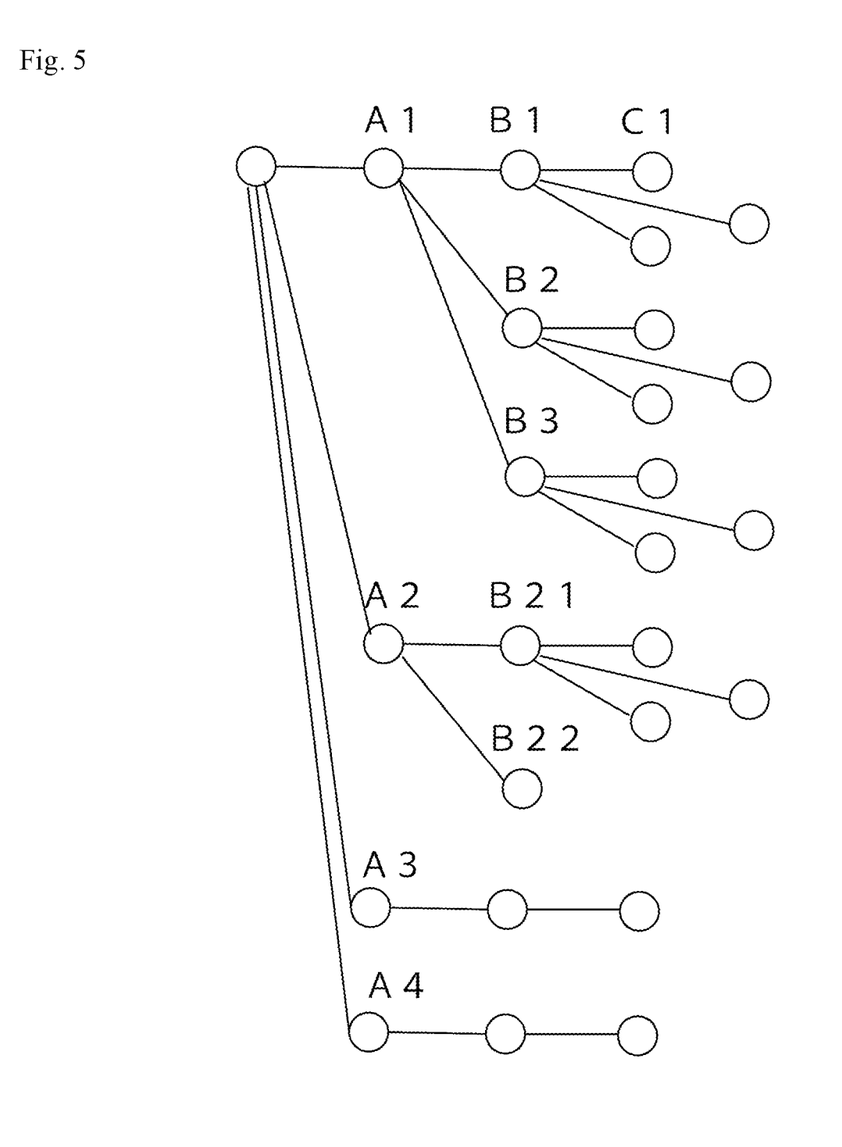
FIG. 5 is a conceptual diagram to describe a flow of related terms and subsequent related terms related to a certain presentation material.

FIG. 5 is a conceptual diagram to describe a flow of the related terms and the subsequent related terms related to a certain presentation material. In this example, A1 to A4 are present as the related terms, and B1 to B3 are present as the subsequent related terms related to A1. Note that, a mode related to related terms and the subsequent related terms may be selected before and after the material selection step (S101), and the flow of the related terms and the subsequent related terms in accordance with the selected mode may be selected. This allows selecting the mode for description (example: in a pattern of considerably easy to understand, brief, dynamic, and good past business results) considering an atmosphere of a site and the other person.

Voice Recognition Step (S103)

Using a sound pickup device, such as a microphone, the computer inputs the voice to the computer. The computer appropriately converts the voice into digital information and stores it in the storage unit. Using a voice analysis program, the term analysis unit analyzes the words included in the conversations to obtain the conversation information. Such a voice conversion system is publicly known.

Related Term Analysis Step (S104)

The related term analysis unit analyzes whether the word analyzed by the term analysis unit is any of the plurality of related terms. It is only necessary that this work reads the related terms (A1 to A4) and collates them with the word analyzed by the term analysis unit to determine whether the word analyzed by the term analysis unit is any of the related terms (A1 to A4), and continues the determination whether the analyzed term is the related terms (A1 to A4) until the related terms (A1 to A4) appear. For example, when the word analyzed by the term analysis unit matches the related term (A1), the related term (A1) may be stored in the storage unit as the analyzed related term.

Subsequent Related Term Selection Step (S105)

When the certain related term is used, the subsequent related term selection unit reads the analyzed related term (A1) from the storage unit and selects the subsequent related terms related to the analyzed related term from the subsequent information storage unit. For example, when the word analyzed by the term analysis unit (accordingly, the word spoken by the presenter) is the related term (A1), the subsequent related terms (B1 to B3) are read. The subsequent related terms are thus read, and therefore this method allows the user to provide various kinds of support.

Subsequent Related Term Display Step (S106)

The computer displays the read subsequent related terms (B1 to B3) at predetermined positions of the presentation displayed in the display unit. These subsequent related terms (B1 to B3) are preferably displayed in the display unit of the computer that can be visually perceived by the presenter and not displayed in a display unit of the other person. Reasonably, the presentation may be performed using one personal computer.

Figure 6:
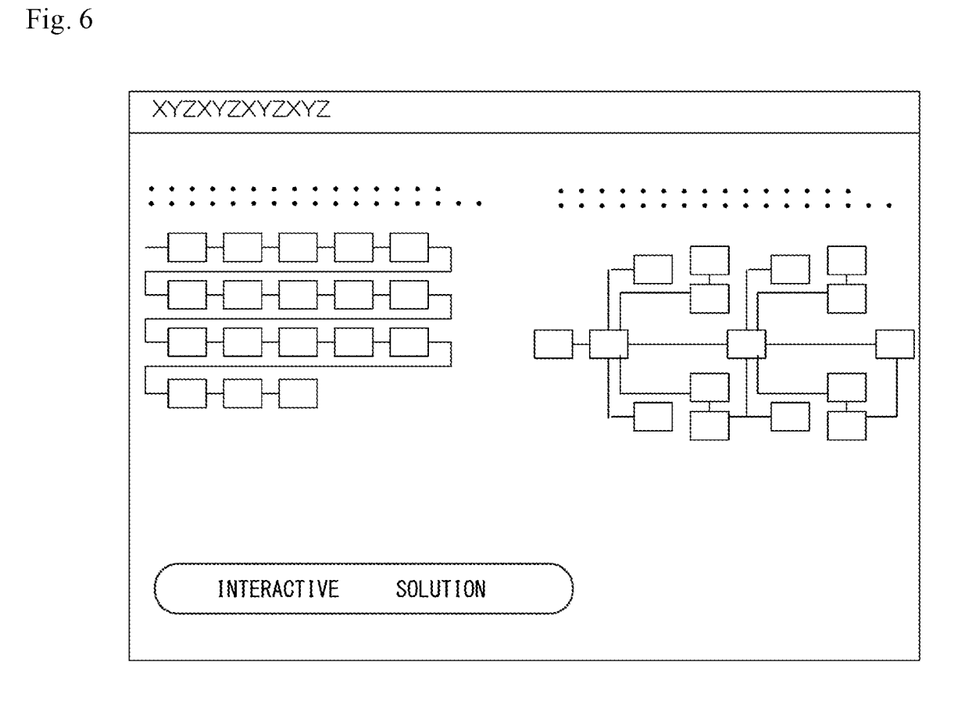
FIG. 6 is a conceptual diagram illustrating an example in which a plurality of subsequent related terms are displayed in a display unit.

FIG. 6 is a conceptual diagram illustrating an example in which the plurality of subsequent related terms are displayed in the display unit. In this example, an interactive and a solution are displayed as the subsequent related terms, and when any of these terms is selected, a page related to each subsequent related term is read and displayed in the display unit.

Subsequent Material Display Step (S107)

For example, the display unit of the computer is a touchscreen, and a user touches any of the subsequent related terms displayed in the display unit. Then, the information on the selection of the subsequent related term is input to the computer. This information may be input using a computer mouse or another means. Since the computer stores the presentation materials and the pages related to the subsequent related terms, the presentation material or its page related to the input subsequent related term is displayed in the display unit.

INDUSTRIAL APPLICABILITY

Since the present invention relates to a presentation support device, the present invention can be used for information-related industry.

DESCRIPTION OF REFERENCE SIGNS

1 Presentation support system
3 Presentation material storage unit
5 Related term storage unit
7 Subsequent information storage unit
9 Term analysis unit
11 Related term analysis unit
13 Display unit
15 Subsequent related term selection unit
17 Related term display control unit
19 Related presentation material display control unit

The invention claimed is:

1. A presentation support system implemented by a computer, comprising:
a presentation material storage unit, which uses a memory in the computer, configured to store a presentation material;
a related term storage unit, which uses the memory in the computer, configured to store a plurality of related terms related to the presentation material stored by the presentation material storage unit;
a subsequent information storage unit, which uses the memory in the computer, configured to store information on a subsequent related term as one or a plurality of subsequent related terms preferred to be used next to each of the plurality of related terms stored by the related term storage unit;
a microphone which is configured to convert voice of a presenter during the presentation of the presentation material into digital information of the voice of the presenter;
a term analysis unit, which is in the computer, configured to analyze words included in the digital information of the voice of the presenter to obtain conversation information consisting of the analyzed words;
a related term analysis unit, which is in the computer, configured to analyze whether the word analyzed by the term analysis unit is any of the plurality of related terms stored in the related term storage unit by means of the computer; if yes, the related term analysis unit reads the related terms and collates them with the words analyzed by the term analysis unit to determine whether the word analyzed by the term analysis unit is any of the related terms, and continues the determination whether the analyzed word is the related terms until the related terms appear; when the word analyzed by the term analysis unit matches the related term, the related term may be stored in the related term storage unit as an analyzed related term;
a display unit configured to display the presentation material, wherein the display unit is a monitor;
a subsequent related term selection unit, which is in the computer, configured to, for an analyzed related term, read the analyzed related term from the related term storage unit, and select one or a plurality of the subsequent related terms related to the analyzed related term from the subsequent information storage unit using information on the analyzed related term as the related term analyzed by the related term analysis unit by means of the computer; and
a subsequent related term display control unit, which is in the computer, configured to cause the display unit to display one or a plurality of the subsequent related terms;
wherein the presentation material storage unit is configured to associate a related presentation material included in the presentation material with any of the plurality of related terms and store the related presentation material by means of the computer,
the presentation support system further comprises a related presentation material display control unit, which is in the computer, configured to receive information on the selected subsequent related term, read the related presentation material stored related to the subsequent related term from the presentation material storage unit, and cause the display unit to display the related presentation material related to the subsequent related term using the information on the subsequent related term related to the analyzed related term selected by the subsequent related term selection unit.

2. The presentation support system according to claim 1, wherein
the plurality of related terms include a taboo word prohibited to be used related to the presentation material,
the subsequent information storage unit includes a correction word as the subsequent related term related to the taboo word, and
the presentation support system further comprises a correction guide unit, which uses the memory in the computer, configured such that when the word analyzed by the related term analysis unit is the taboo word, the correction guide unit causes the display unit to display the correction word.

3. The presentation support system according to claim 1, wherein
   the information on the subsequent related term stored by the subsequent information storage unit is updated by analyzing an order of appearance of the plurality of related terms included in a plurality of conversations related to the presentation material by means of the computer.

4. The presentation support system according to claim 1, wherein
   the subsequent information storage unit is configured to store a plurality of patterns of the information on the subsequent related terms, and
   the subsequent related term selection unit is configured such that when any of the plurality of patterns is selected, the subsequent related term selection unit selects the subsequent related term related to the selected pattern by means of the computer.

5. The presentation support system according to claim 1, wherein the monitor is a touchscreen.

6. The presentation support system according to claim 5, wherein the subsequent related term selection unit is realized by the touchscreen and the touchscreen is configured to be used in selecting one of the plurality of the subsequent related terms.

\* \* \* \* \*